G. A. BREAULT.
MOLD FORMING MECHANISM.
APPLICATION FILED JULY 20, 1912.

1,065,774.

Patented June 24, 1913.

2 SHEETS—SHEET 1.

Witnesses

Inventor
George A. Breault
By Victor J. Evans
Attorney

G. A. BREAULT.
MOLD FORMING MECHANISM.
APPLICATION FILED JULY 20, 1912.

1,065,774.

Patented June 24, 1913.
2 SHEETS—SHEET 2.

Inventor
George A. Breault
By Victor J. Evans
Attorney

Witnesses
Philip E. Barnes

UNITED STATES PATENT OFFICE.

GEORGE A. BREAULT, OF FALL RIVER, MASSACHUSETTS.

MOLD-FORMING MECHANISM.

1,065,774.

Specification of Letters Patent.  Patented June 24, 1913.

Application filed July 20, 1912. Serial No. 710,609.

*To all whom it may concern:*

Be it known that I, GEORGE A. BREAULT, a citizen of the United States, residing at Fall River, in the county of Bristol and State of Massachusetts, have invented new and useful Improvements in Mold-Forming Mechanism, of which the following is a specification.

This invention relates to mold forming mechanism, and the object of the invention is to provide a simple and efficient means for holding the work and turning the grooves in the work which are adapted to receive the molten matter.
The device is particularly adapted for forming molds for producing solid gold wedding rings and like devices and consists essentially in a tool chuck, a centering drill and a hand operated work support and holder.

A further object of the invention is to provide a novel cutter chuck which has the cutter so mounted thereon that it may be conveniently and expeditiously adjusted with relation to the center, whereby circular grooves of different diameters may be readily produced.

Further objects of this invention will appear as the following specific description is read in connection with the accompanying drawing, which forms a part of this application, and in which:—

Figure 1:
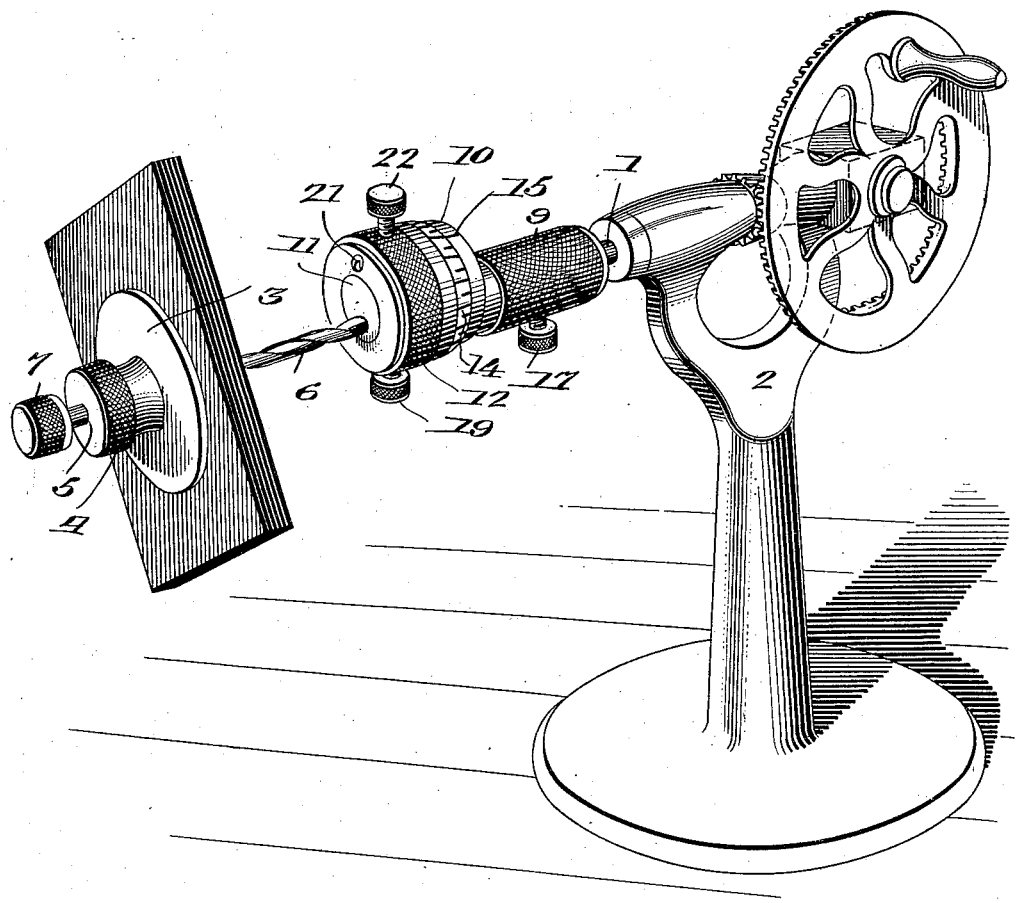
Figure 2:
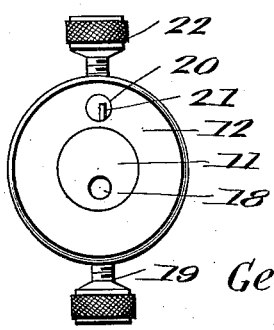
Figure 3:
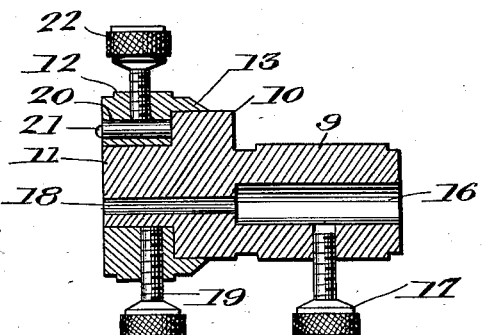
Figures 4, 5:
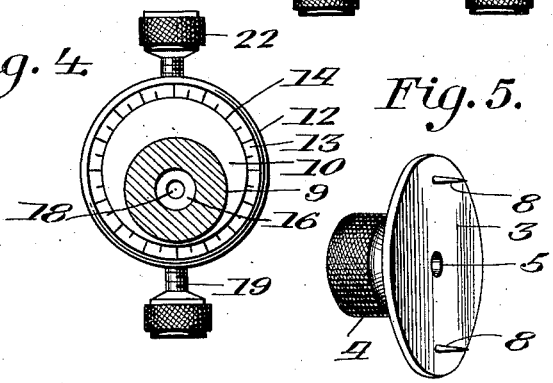
Figure 8:
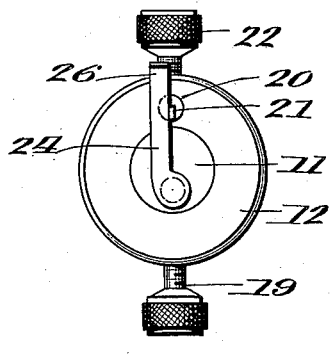
Figure 6:
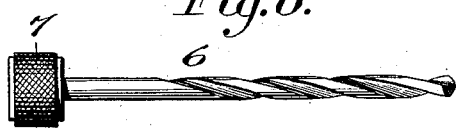
Figure 9:
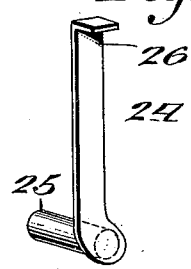
Figure 7:
Figure 10:
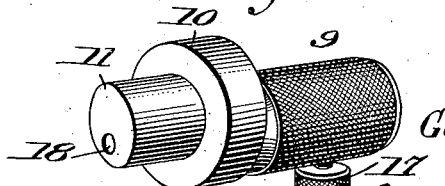

Figure 1 is a perspective view showing the chuck mounted upon a hand lathe and with the work holder and work in position to be operated upon. Fig. 2 is an end view of the chuck. Fig. 3 is a longitudinal section taken therethrough. Fig. 4 is a transverse sectional view taken through the chuck. Fig. 5 is a perspective view of the work holder. Fig. 6 is a side elevation of the centering drill. Fig. 7 is a perspective view of one of the cutters removed. Fig. 8 is an end view of the chuck showing the cutter setter in position. Fig. 9 is a perspective view of the cutter setter. Fig. 10 is a perspective view of the chuck body with the cutter head removed.

In the specific embodiment of the invention, as illustrated herein, the chuck is shown mounted upon the spindle 1 of an ordinary hand lathe 2. It will be understood, however, that this chuck may be operated by hand or upon an ordinary power lathe and the work holder suitably held in the tail stock thereof. The work holder comprises a disk 3 having a knurled head 4 formed thereon and both are concentrically bored, as shown at 5, to permit the passage of the centering drill 6 which, in this instance, carries a knurled operating head 7. The disk is provided with penetrating pins 8 which are adapted to enter the work, as will be hereinafter described so that when the disk is held against rotation, the work will be held stationary with the disk.

The chuck comprises a substantially cylindrical body 9 having an eccentric mounting head 10 formed thereon from which projects a concentric circular stud 11. Fitting over and revolubly mounted upon the stud 11 is a cutter head 12 which is provided with a flange 13 to overhang the eccentric head 10. This flange is provided with graduations 14 adapted to register with a zero mark 15 upon the head 10. Extending centrally into the body 9 is a bore 16 which is adapted to receive the spindle 1 and threaded into the body is a set screw 17 adapted to lock the body upon said spindle. Communicating with the bore 16 is a bore 18 which passes eccentrically through the head 10 and the stud 11, as shown. The head 12 is locked upon the stud 11 by means of a set screw 19 and said head is provided with an eccentric socket 20 in which a suitable type of cutter 21 is mounted and held in stationary position by the set screw 22. In order to set these cutters of which, it will be understood, there are a plurality so as to cut different shaped grooves, I provide a setting key 24 having a lateral pivotal stud 25 provided to enter the aperture or bore 18. The arm of this key has an upstanding end 26 by which the arm may be moved into engagement with the cutter, thereby alining its cutting face radially with the center of the bore 18.

In the operation of the device, the pins 8 are inserted in the piece of charcoal and the drill passed through the central bore 5 in the work holder and forced through the piece of charcoal used for the mold section. The end of the drill is then inserted in the bore 18 and the lathe 2 operated so as to rotate the chuck while the work holder is held stationary by the hand. The cutter 21 may be adjusted toward and away from the bore 18 by rotating the head 12 on the stud 11.

In each adjustment of the cutter, the same must be set so as to have its cutting face radial to the center of the bore 18.

What is claimed is:—

1. An apparatus of the character described comprising a hand operated work support, a tool holding chuck, and a drill adapted to pass through the work holder, the work thereon, and to be centered into the chuck, together with a tool carried eccentrically by the chuck.

2. A chuck comprising a body having a longitudinal central bore, an eccentric head on the body, a concentric stud on the head, said bore passing through the stud eccentrically, a tool holding head mounted for rotation upon and concentric with the stud, an eccentrically mounted tool carried by the holder, and means to secure the holder in adjusted position on the stud.

In testimony whereof I affix my signature in presence of two witnesses.

GEORGE A. BREAULT.

Witnesses:
 ALPHONSE S. LeBLANC,
 ADELARD JOSEPH LeBLANC.

---

Copies of this patent may be obtained for five cents each, by addressing the "Commissioner of Patents, Washington, D. C."